United States Patent
Agrawal et al.

(10) Patent No.: US 12,375,798 B2
(45) Date of Patent: Jul. 29, 2025

(54) AUTOMATICALLY CUSTOMIZING CAMERA SETTINGS FOR USERS

(71) Applicant: Motorola Mobility LLC, Chicago, IL (US)

(72) Inventors: Amit Kumar Agrawal, Bangalore (IN); Thiago Francisco Martins, Sao Paulo (BR); Benicio Pereira Goulart, Campinas (BR); Boby Iyer, Elmhurst, IL (US)

(73) Assignee: Motorola Mobility LLC, Chicago, IL (US)

( * ) Notice: Subject to any disclaimer, the term of this patent is extended or adjusted under 35 U.S.C. 154(b) by 47 days.

(21) Appl. No.: 18/228,882

(22) Filed: Aug. 1, 2023

(65) Prior Publication Data

US 2025/0047971 A1    Feb. 6, 2025

(51) Int. Cl.
*H04N 23/60* (2023.01)
*H04N 23/63* (2023.01)

(52) U.S. Cl.
CPC ........... *H04N 23/64* (2023.01); *H04N 23/632* (2023.01)

(58) Field of Classification Search
CPC .............................. H04N 23/64; H04N 23/632
USPC .................................................... 348/222.1
See application file for complete search history.

(56) References Cited

U.S. PATENT DOCUMENTS

| | | | |
|---|---|---|---|
| 2015/0325023 A1* | 11/2015 | Gross | G06V 10/255 |
| | | | 382/203 |
| 2019/0043172 A1* | 2/2019 | Chui | G06T 5/60 |
| 2019/0295223 A1* | 9/2019 | Shen | G06T 5/60 |
| 2021/0117948 A1* | 4/2021 | Voss | G06Q 20/322 |
| 2025/0045872 A1 | 2/2025 | Agrawal et al. | |

OTHER PUBLICATIONS

"HUAWEI Built-in Photo Editor", HUAWEI [retrieved Apr. 24, 2023]. Retrieved from the Internet <https://consumer.huawei.com/en/community/details/HUAWEI-Built-in-Photo-Editor/topicld_139370/>., 13 Pages.

"iPhone User Guide iOS 16", Apple Inc. [retrieved Apr. 24, 2023]. Retrieved from the Internet <https://support.apple.com/guide/iphone/edit-photos-and-videos-iphb08064d57/ios>., 4 Pages.

Agrawal, Amit Kumar, et al., "Pursuant to MPEP § 2001.06(b) the applicant brings the following co-pending application to the Examiner's attention:", U.S. Appl. No. 18/228,897, filed Aug. 1, 2023, 53 pages.

Kostadinov, Peter, "Samsung has a new AI-powered photo editor app with lots of features", Phone Arena [retrieved Apr. 24, 2023]. Retrieved from the Internet <https://www.phonearena.com/news/Samsung-has-a-new-AI-powered-photo-editor-app-with-lots-of-features_id141398>., Jul. 18, 2022, 20 Pages.

(Continued)

*Primary Examiner* — Usman A Khan
(74) *Attorney, Agent, or Firm* — FIG. 1 Patents

(57) ABSTRACT

Generally, an artificial intelligence model is trained based on input from a user to identify preferences of the user for media content, such as images. Camera settings are automatically applied to media content based on the identified preferences of the user so that the user is automatically presented with media content displayed in accordance with his or her preferences.

20 Claims, 10 Drawing Sheets

(56) References Cited

OTHER PUBLICATIONS

Russell, Brandon, "Google Photos gets improved editor and suggestions feature on Android", XDA [retrieved Apr. 24, 2023]. Retrieved from the Internet <https://www.xda-developers.com/how-to-download-android-14/>., Sep. 30, 2020, 14 Pages.
"Non-Final Office Action", U.S. Appl. No. 18/228,897, filed May 14, 2025, 8 pages.

* cited by examiner

AUTOMATICALLY CUSTOMIZING CAMERA SETTINGS FOR USERS

BACKGROUND

As technology has advanced our uses for electronic devices have expanded. One such use is digital photography. Many electronic devices, such as mobile phones, include imaging devices allowing users to capture digital images. While many users enjoy the ability to capture digital images with their electronic devices, current imaging devices are not without their problems. One such problem is that electronic devices are configured to automatically use various camera settings, such as a saturation setting or a contrast setting. However, these camera settings are set for a very large population of users and electronic devices, and different users can have different preferences. Accordingly, for some users these settings may not result in images with the look or feel that the user prefers, which can be frustrating for users and lead to user frustration with their devices.

BRIEF DESCRIPTION OF THE DRAWINGS

Embodiments of automatically customizing camera settings for users are described with reference to the following drawings. The same numbers are used throughout the drawings to reference like features and components.

DETAILED DESCRIPTION

Automatically customizing camera settings for users is discussed herein. Generally, an artificial intelligence model is trained based on input from a user to identify preferences of the user for media content, such as images. Camera settings are automatically applied to media content based on the identified preferences of the user so that the user is automatically presented with media content displayed in accordance with his or her preferences.

In one or more implementations, media content (e.g., an image) is captured using a camera sensor module of an electronic device. An artificial intelligence model is used to identify user preferences for media content captured by the camera sensor module, the artificial intelligence model having been trained based on user input from a user of the electronic device. An enhanced media content is automatically generated by applying camera settings to the captured media content based on the identified user preferences. An action is taken with the enhanced media content, such as displaying the enhanced media content, storing the enhanced media content, sharing the enhanced media content with one or more other users, and so forth.

Additionally or alternatively, at a first electronic device metadata is received from a second electronic device. An artificial intelligence model is used to identify user preferences for media content for a user of the first electronic device, the artificial intelligence model having been trained based on user input from the user of the electronic device. An enhanced media content is automatically generated, based at least in part on media content capture metadata associated with the media content, by applying camera settings to the received media content based on the identified user preferences. An action is taken with this enhanced media content, such as displaying the enhanced media content, storing the enhanced media content, sharing the enhanced media content with one or more other users, and so forth.

Figure 1:
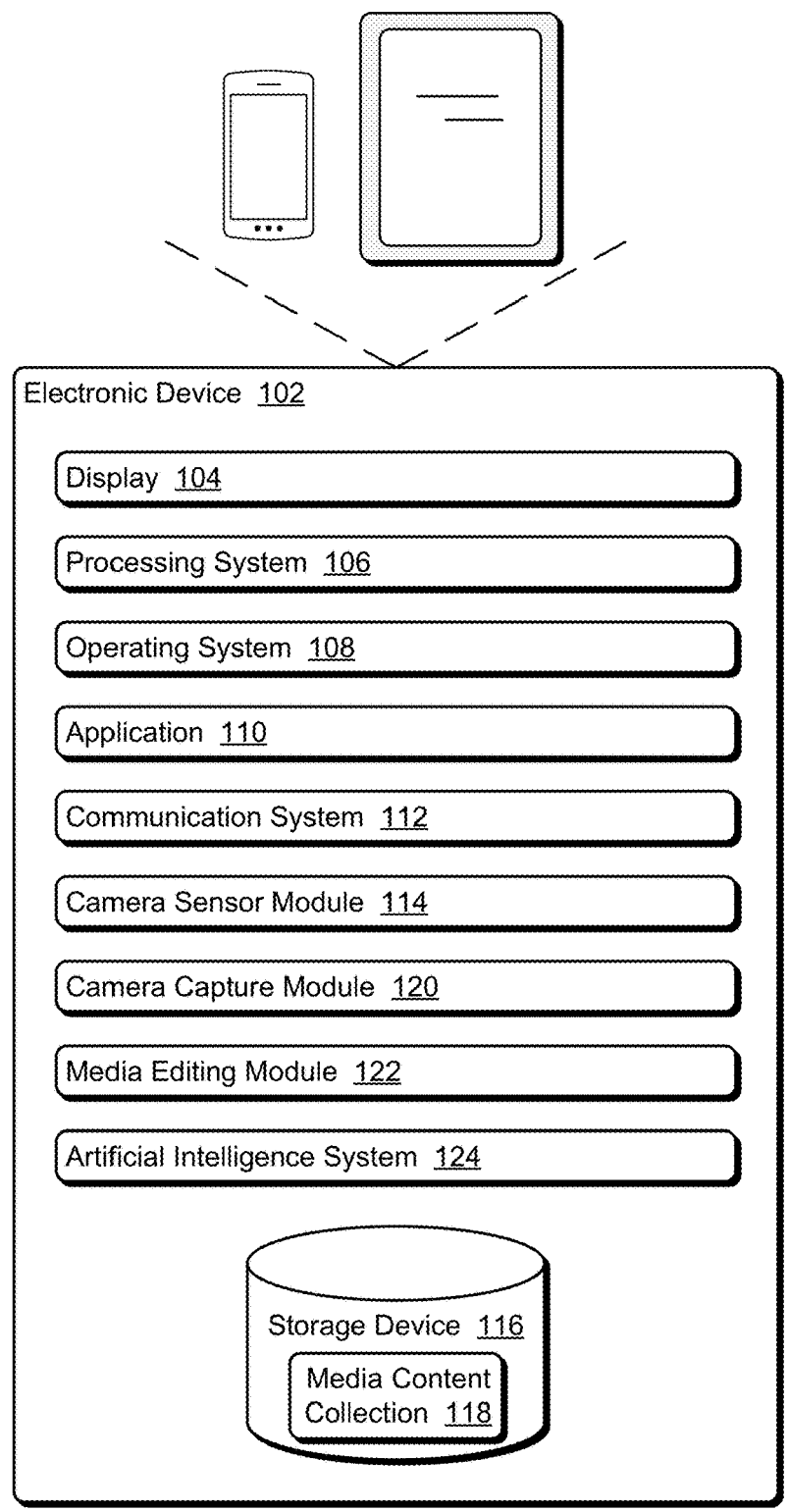
FIG. 1 illustrates an example electronic device implementing the techniques discussed herein.

FIG. 1 illustrates an example electronic device 102 implementing the techniques discussed herein. The electronic device 102 can be, or include, many different types of computing or electronic devices. For example, the electronic device 102 can be a smartphone or other wireless phone, a camera (e.g., compact or single-lens reflex), or a tablet or phablet computer. By way of further example, the electronic device 102 can be a notebook computer (e.g., netbook or ultrabook), a laptop computer, a wearable device (e.g., a smartwatch, an augmented reality headset or device, a virtual reality headset or device), a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, an automotive computer, and so forth.

The electronic device 102 includes a display 104. The display 104 can be configured as any suitable type of display, such as an organic light-emitting diode (OLED) display, active matrix OLED display, liquid crystal display (LCD), in-plane shifting LCD, projector, and so forth. Although illustrated as part of the electronic device 102, it should be noted that the display 104 can be implemented separately from the electronic device 102. In such situations, the electronic device 102 can communicate with the display 104 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. The display 104 can also optionally operate as an input device (e.g., the display 104 can be a touchscreen display).

The electronic device 102 also includes a processing system 106 that includes one or more processors, each of which can include one or more cores. The processing system 106 is coupled with, and may implement functionalities of, any other components or modules of the electronic device 102 that are described herein. In one or more embodiments, the processing system 106 includes a single processor having a single core. Alternatively, the processing system 106 includes a single processor having multiple cores or multiple processors (each having one or more cores).

The electronic device 102 also includes an operating system 108. The operating system 108 manages hardware, software, and firmware resources in the electronic device 102. The operating system 108 manages one or more applications 110 running on the electronic device 102, and operates as an interface between applications 110 and hardware components of the electronic device 102.

The electronic device 102 also includes a communication system 112. The communication system 112 manages communication with various other devices, including establishing voice calls with other devices, sending electronic communications to and receiving electronic communications from other devices, sending media content (e.g., images) to and receiving media content (e.g., images) from other devices, and so forth. The content of these electronic communications and the recipients of these electronic communications is managed by an application 110 or the operating system 108.

The electronic device 102 also includes a camera sensor module 114. The camera sensor module 114 captures images or video digitally using any of a variety of different technologies, such as a charge-coupled device (CCD) sensor, a complementary metal-oxide-semiconductor (CMOS) sensor, combinations thereof, and so forth. The camera sensor module 114 can include a single sensor and lens, or alternatively multiple sensors or multiple lenses. For example, the camera sensor module 114 may have at least one lens and sensor positioned to capture images or video from the front of the electronic device 102 (e.g., the same surface as the display is positioned on), and at least one additional lens and sensor positioned to capture images or video from the back or rear of the electronic device 102. By way of another example, the camera sensor module 114 may have multiple lenses and sensors corresponding to different focal lengths, such as a telephoto lens, a wide angle lens, an ultrawide angle lens, and so forth. By way of another example, the camera sensor module 114 may include a macro lens and sensor having a closer focus range than any of the telephoto, wide, or ultrawide lenses and sensors. It should be noted that each lens may have its own sensor or multiple lenses may use the same sensor.

The camera sensor module 114 can capture still images as well as video. The media content discussed herein refers to one or both of still images and video. The captured images or video are stored in a storage device 116 as a media content collection 118. The storage device 116 can be implemented using any of a variety of storage technologies, such as magnetic disk, optical disc, Flash or other solid state memory, and so forth. Additionally or alternatively, the storage device 116 stores various program instructions and data for any one or more of the operating system 108, application 110, communication system 112, camera capture module 120, media editing module 122, and artificial intelligence system 124.

The electronic device 102 also includes a camera capture module 120, a media editing module 122, and an artificial intelligence system 124. Each of the camera capture module 120, the media editing module 122, and the artificial intelligence system 124 can be implemented in a variety of different manners. For example, each of the modules or systems 120, 122, and 124 can be implemented as multiple instructions stored on computer-readable storage media and that can be executed by the processing system 106. Additionally or alternatively, each of the modules or systems 120, 122, and 124 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth). One or more of the modules or systems 120, 122, and 124 can be implemented in the same manner, or the modules or systems 120, 122, and 124 can each be implemented in a different manner. Furthermore, although illustrated as separate from the operating system 108, one or more of the camera capture module 120, a media editing module 122, and an artificial intelligence system 124 can be implemented at least in part as part of the operating system 108.

The camera capture module 120 coordinates with the camera sensor module 114 to manage capturing media content. The camera capture module 120 provides various settings to the camera sensor module 114 so that the camera sensor module 114 captures media content with specific settings. Various different settings can be controlled that affect the quality or appearance of media content captured by the camera sensor module 114, such as auto white balance, auto focus, auto exposure, shutter speed, sensitivity of the sensor in the camera sensor module 114 (e.g., the ISO), sharpness/noise relation, saturation, brightness, color tint, contrast and highlights, and so forth.

The media editing module 122 displays or otherwise presents captured media content (e.g., on the display 104) and performs editing on the media content. Various user input can be received to alter various characteristics of the captured media content, such as one or more of a saturation setting, a brightness setting, a white balance setting, a sharpness setting, a color tint setting, and so forth.

In one or more implementations, the camera capture module 120 and the media editing module 122 are implemented as separate programs (e.g., separate applications 110 or programs of the operating system 108). Additionally or alternatively, the camera capture module 120 and the media editing module 122 are implemented as part of the same program, such as a social media application.

The artificial intelligence system 124 monitors and learns user preferences based on user input, such as editing actions performed by the user on displayed media content (e.g., that has been captured by the camera sensor module 114), user selection of media content that is more appealing or more desirable to the user, and so forth. The artificial intelligence system 124 provides the learned user preferences to one or both of the camera capture module 120 or the media editing module 122, allowing one or both of the camera capture module 120 and media editing module 122 to apply the learned user preferences to media content. Additionally or alternatively, the artificial intelligence system 124 may be implemented as part of one or both of the camera capture model or the media editing module 122.

The artificial intelligence system 124 includes an artificial intelligence model as discussed in more detail below. In one or more implementations, an artificial intelligence model is included in or embedded in the electronic device 102 at the time the electronic device 102 is manufactured. Additionally or alternatively, an artificial intelligence model is obtained from another device, such as a remote server, the cloud, the electronic device of another user, and so forth. Additionally or alternatively, an artificial intelligence model may be maintained on a remote server or in the cloud rather than being present on the electronic device 102.

Figure 2:
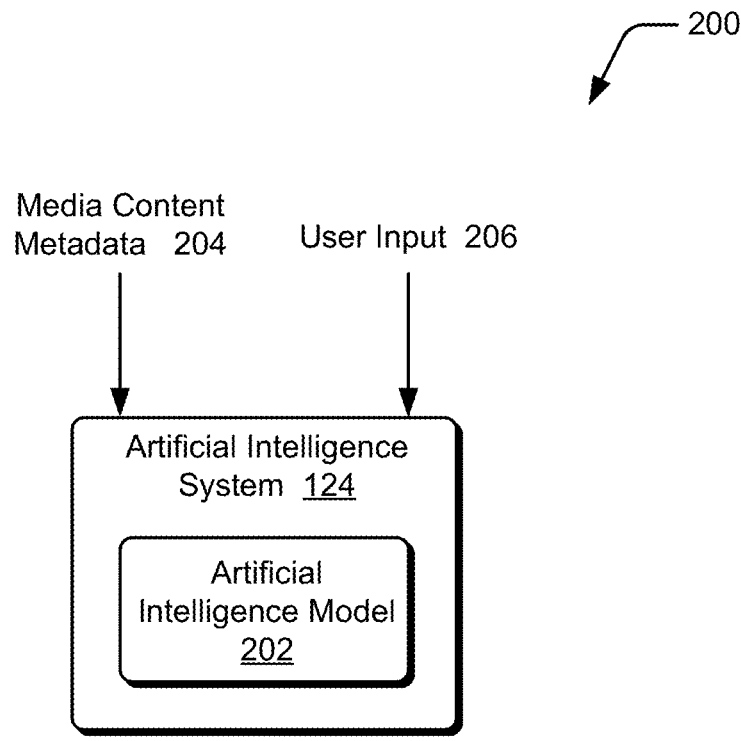
FIG. 2 illustrates an example system implementing techniques discussed herein.

FIG. 2 illustrates an example system 200 implementing techniques discussed herein. The system 200 includes the artificial intelligence system 124, which includes an artificial intelligence model 202. The artificial intelligence model 202 is an artificial intelligence or machine learning system that can be implemented using any of a variety of different public and/or proprietary machine learning techniques. Machine learning systems refer to a computer representation that can be tuned (e.g., trained) based on inputs to approximate unknown functions. In particular, machine learning systems can include a system that uses algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

The artificial intelligence model 202 is trained based on media content metadata 204 and user input 206. The media content metadata 204 is information associated with a media content captured by an electronic device and describes various camera settings of the electronic device and optionally information describing the environment the electronic device was in when the media content was captured. Examples of these camera settings include white balance (e.g., auto white balance (AWB)), auto or manual focus, shutter speed, sensitivity to light (e.g., ISO), brightness, noise or sharpness, color tint, saturation contrast, light level (e.g., lux), illuminant, shutter speed, whether images were stacked to reduce noise levels, whether high dynamic range (HDR) was used in capturing the media content, a camera type (e.g., front-facing or rear-facing camera), characteristics of the scene captured in the media content (e.g., person, landscape), and so forth.

The user input 206 refers to input indicating the camera setting preferences of a user. This user input 206 can take various forms, such as user input changing made to the camera settings (e.g., increasing or decreasing values for one or more of white balance, brightness, noise or sharpness, color tint, or saturation), user selection of a look or feel they prefer for media content (e.g., the user prefers one or more of saturated colors, warmer white balance, or brighter pictures), user acceptance or rejection of editing recommendations made to the user (e.g., by the artificial intelligence system 124 or from another module (e.g., the media editing module 122). The artificial intelligence system 124 can use any user input changing the camera settings of a media content to further train the artificial intelligence model 202.

The artificial intelligence model 202 can be trained and then retrained at various intervals, such as after a certain time span (e.g., weekly or monthly), after a threshold number of media content have been captured (e.g., 100 or 1000 images), after a threshold number of media content have been edited by the user (e.g., every 50 images), and so forth.

Figure 3:
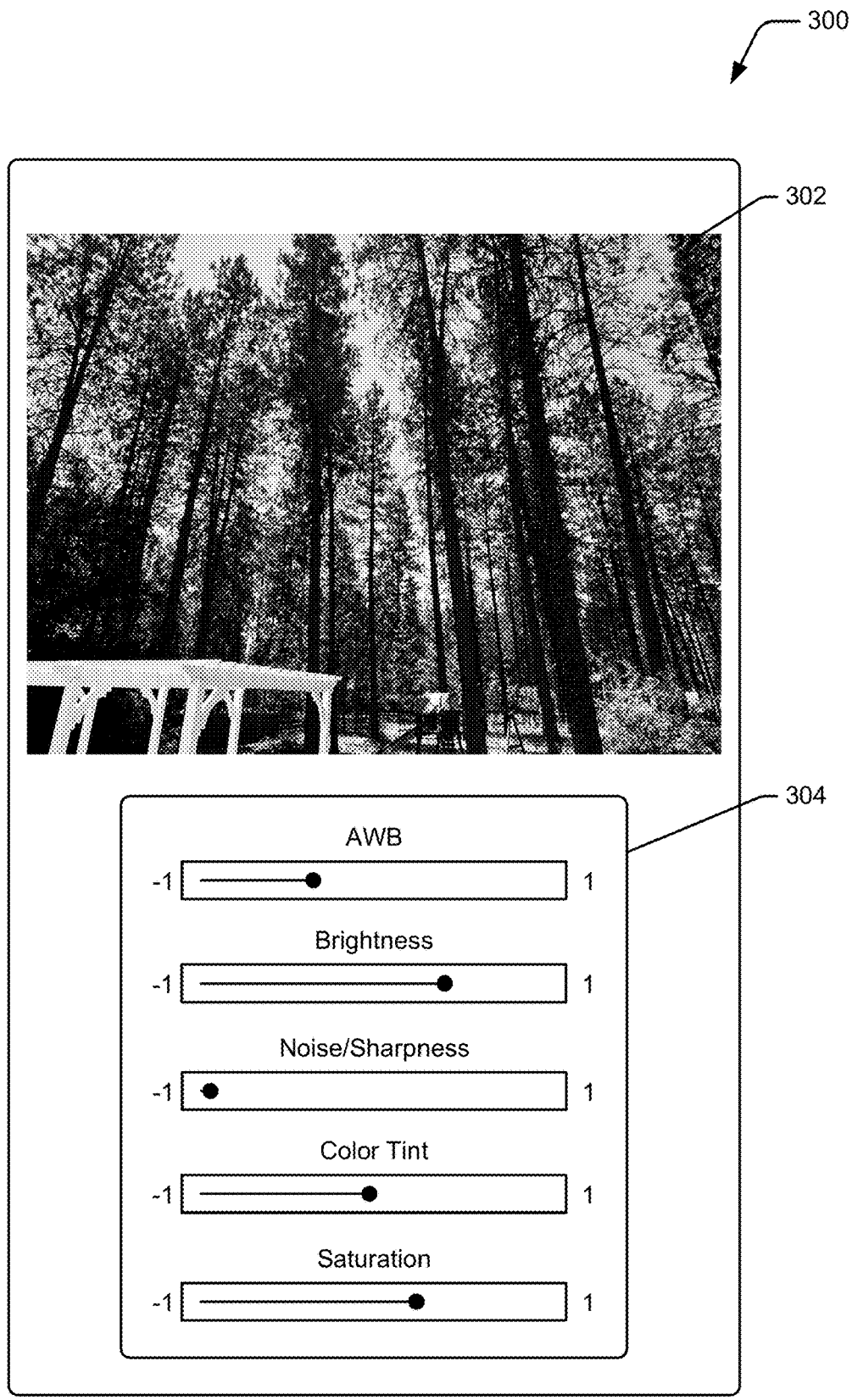
FIGS. 3, 4, and 5 illustrate example user interfaces allowing a user to change media content metadata.

FIG. 3 illustrates an example user interface 300 allowing a user to change media content metadata. The user interface 300 can be displayed by any of various programs, applications, or modules, such as the camera capture module 120, the media editing module 122, a photo gallery application, and so forth. The user interface 300 allows the user to provide user input 206.

The user interface 300 displays an image 302 and a control panel 304. The control panel 304 includes multiple slider controls that the user can select and slide to the left or right to change various camera settings in a range from −1 to +1. The control panel 304 includes slider controls for the camera settings of white balance (e.g., auto white balance (AWB)), brightness, noise or sharpness, color tint, and saturation. The changed settings can be saved in various manners, such as user selection of a "save" button (not shown), the user closing the user interface 300 or the control panel 304, and so forth.

Figure 4:
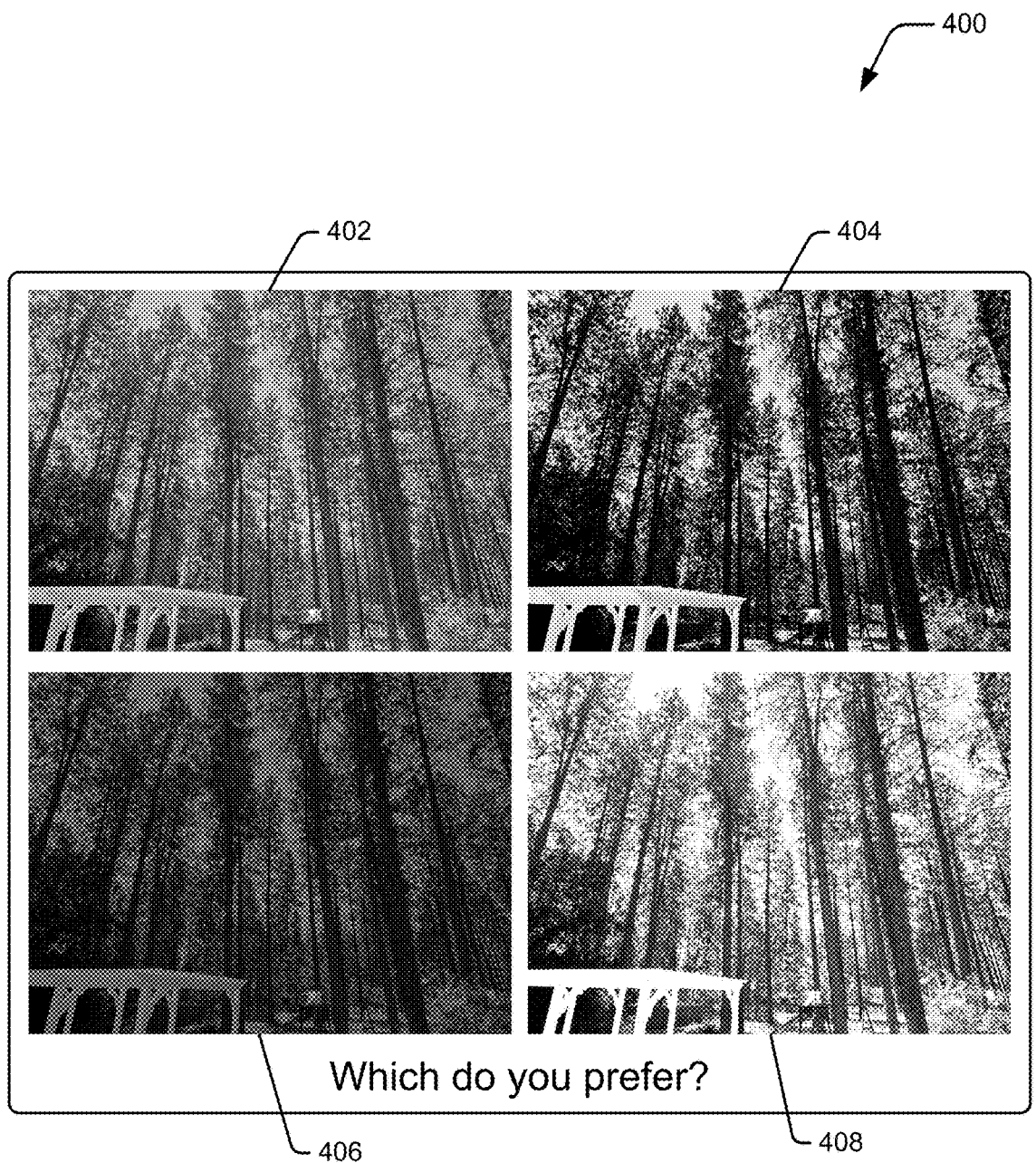

FIG. 4 illustrates an example user interface 400 allowing a user to change media content metadata. The user interface 400 can be displayed by any of various programs, applications, or modules, such as the camera capture module 120, the media editing module 122, a photo gallery application, and so forth. The user interface 400 allows the user to provide user input 206.

The user interface 400 displays four images 402, 404, 406, and 408, each of which has a different look or feel. The images 402, 404, 406, and 408 are modified image recommendations (e.g., generated by the artificial intelligence system 124) for the user. For example, one may have more saturated colors, another may have warmer white balance, another may be brighter, another may have lower noise or sharpness. The user selects one or more of the four images 402, 404, 406, or 408, providing user input 206 that indicates the look or feel the user prefers for images. The user can select an image 402, 404, 406, or 408 in any of a variety of manners, such as touching the image, clicking on the image with a mouse or trackpad, and so forth.

Figure 5:
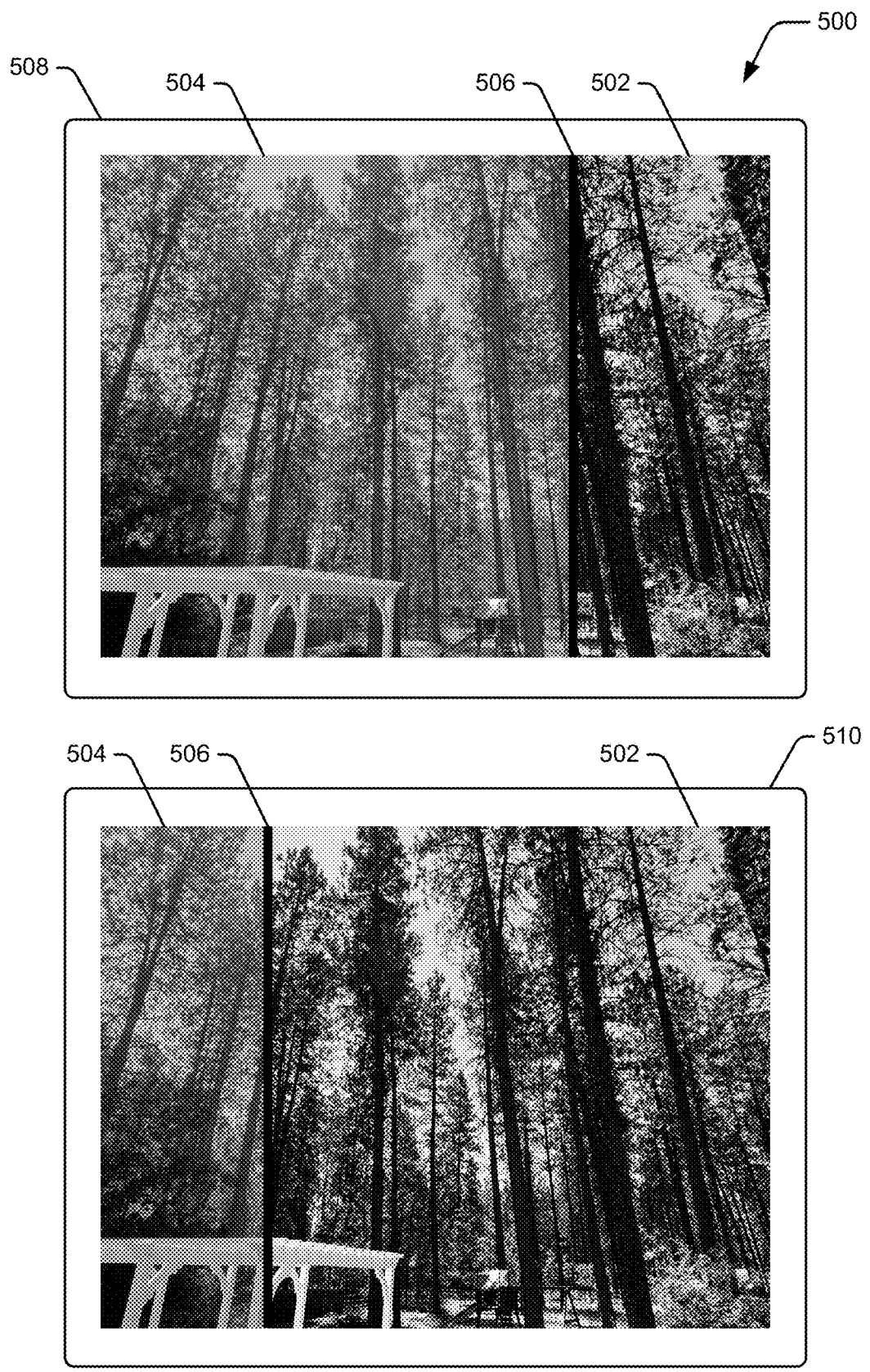

FIG. 5 illustrates an example user interface 500 allowing a user to change media content metadata. The user interface 500 can be displayed by any of various programs, applications, or modules, such as the camera capture module 120, the media editing module 122, a photo gallery application, and so forth. The user interface 500 allows the user to provide user input 206.

The user interface 500 concurrently displays two images 502 and 504, each of which has a different look or feel. For example, one may have more saturated colors and the other have less saturated colors. The images 502 and 504 are displayed overlapping and the user can move a bar 506 left or right to control to display different portions of the images 502 and 504. As illustrated at 508, the bar 506 is near the right side of the user interface 500 so that more of image 504 is displayed than image 502. As illustrated at 510, the bar 506 is near the left side of the user interface 500 so that more of image 502 is displayed than image 504. The user can move the bar 506 left and right as desired, allowing the user to easily see the differences between the look or feel of the two images.

The user can select one or more of the image 502 and 504, providing user input 206 that indicates the look or feel the user prefers for images. The user can select an image 502 or 504 in any of a variety of manners, such as touching the image, clicking on the image with a mouse or trackpad, and so forth.

Returning to FIG. 2, the artificial intelligence model 202 is trained to learn indications of camera settings for received media content that a user prefers. Different artificial intelligence models can be trained for different users as discussed in more detail below. The artificial intelligence model 202 can be trained using any of a variety of public or proprietary techniques, such as using supervised learning or unsupervised learning. For example, the artificial intelligence model 202 can be trained by updating connection weights or weights of filters in the artificial intelligence model 202 to minimize a loss between generated camera settings for a media content and known camera settings for the user for the media content (e.g., based on user input).

In one or more implementations, the training of the artificial intelligence model 202 is performed by the artificial intelligence system 124. Additionally or alternatively, the training of the artificial intelligence model 202 is performed by another device (e.g., a server, in the cloud, and so forth). For example, the artificial intelligence system 124 can transmit the received media content metadata 204 and the user input 206 to another device that trains the artificial intelligence model 202 and transmits the trained artificial intelligence model 202 to the artificial intelligence system 124.

Figure 6:
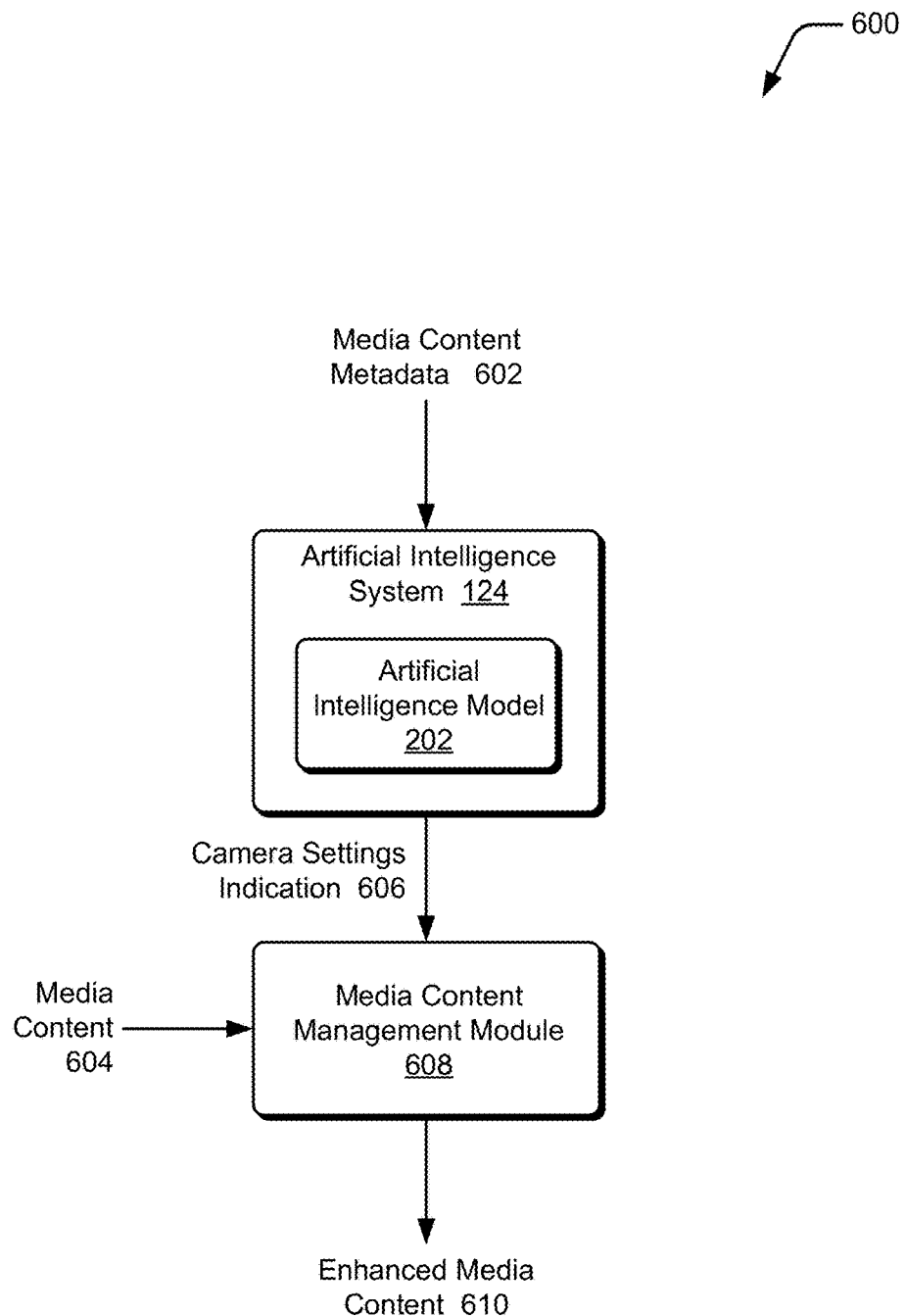
FIG. 6 illustrates an example system implementing techniques discussed herein.

FIG. 6 illustrates an example system 600 implementing techniques discussed herein. The system 600 includes the artificial intelligence system 124, which includes the artificial intelligence model 202. In the system 600, the artificial intelligence model 202 has been trained as discussed above. The artificial intelligence system 124 receives media content metadata 602 for a media content 604 and generates camera settings indication 606. The media content metadata 602 and media content 604 can be received from any of various different sources, such as the camera capture module 120, the media editing module 122, the communication system 112 (e.g., which received the media content metadata 602 and corresponding media content 604 from another device), and so forth. The camera settings indication 606 can take various forms, such as predicted camera settings that are to be used in place of the media content metadata 602, a profile that corresponds to the user's preferences (e.g., usually likes saturated colors, prefers warmer white balance, prefers brighter pictures), and so forth. The camera settings indication 606 is provided to a media content management module 608 that uses the camera settings indication 606 to generate an enhanced media content 610, which is a version of the media content 604 using the camera settings indication 606. The media content management module 608 may be included in various other programs, applications, or modules, such as the camera capture module 120, the media editing module 122, a program of the operating system 108, an application 110, and so forth.

The media content management module 608 can take various actions with the enhanced media content 610, such as displaying the enhanced media content 610 (e.g., on the display 104), storing the enhanced media content 610 (e.g., in the storage device 116), transmitting the enhanced media content 610 to another device, transmitting the enhanced media content to another module or system of the electronic device 102 (e.g., the media editing module 122, communication system), and so forth.

The camera settings indication 606 can take any of a variety of different forms. In one or more implementations, the camera settings indication 606 is the camera settings themselves that the media content management module 608 can use in place of the media content metadata 602 (e.g., set brightness to 0.6, set noise or sharpness to −0.2). Additionally or alternatively, the camera settings indication 606 is an indication of changes the media content management module 608 is to make to the media content metadata 602 (e.g., increase brightness by 0.4, decrease noise or sharpness by 1.0). Additionally or alternatively, the camera settings indication 606 is a user profile, such as the user usually likes saturated colors, prefers warmer white balance, prefers brighter pictures, and so forth. The media content management module 608 determines which camera settings to use based on the indicated profile, such as to increase or decrease particular camera settings by particular amounts.

In one or more implementations, the artificial intelligence system 124 includes a single artificial intelligence model 202 for a user. Additionally or alternatively, the artificial intelligence system 124 may include multiple artificial intelligence models 202 each trained for a user for particular situations or environment. This allows the artificial intelligence system 124 to properly customize camera settings when a user has different preferences for different situations. For example, one artificial intelligence model 202 may be trained for media content captured from a front facing lens and sensor and another artificial intelligence model 202 may be trained for media content captured form a rear facing lens and sensor. Both of these artificial intelligence models 202 are included in the artificial intelligence system 124. By way of another example, a different artificial intelligence model 202 may be trained for each different lens included in the camera sensor module 114 (e.g., one model for a telephoto lens, another model for a wide angle lens, another model for an ultrawide angle lens, another model for a macro lens, and so forth). All of these artificial intelligence models 202 are included in the artificial intelligence system 124.

It should be noted that the artificial intelligence model 202 can be maintained or implemented on the electronic device on another device. For example, the artificial intelligence model 202 may be embedded in or implemented on the electronic device 102. Additionally or alternatively, the artificial intelligence model 202 may be implemented on a remote server or in the cloud. In such situations, the artificial intelligence system 124 transmits an indication of the media content metadata 602 to the remote server or cloud, and receives the camera settings indication 606 from the remote server or cloud.

The techniques discussed herein support various different usage scenarios. In one or more implementations, an electronic device 102 captures a media content (e.g., in response to a user input to take a picture, such as pressing or touching a button) and an enhanced media content 610 is automatically generated by the electronic device 102 based on the camera settings indication 606. The enhanced media content 610 can be displayed immediately to the user, such as via the display 104. The enhanced media content 610 can also be stored, such as in storage device 116 or a remote storage device, transmitted to (e.g., shared with) another device, and so forth. In such situations, the camera settings in the metadata associated with the stored media content are the camera settings for the enhanced media content 610. Accordingly, when the user subsequently opens the media content (e.g., via a photo gallery application), the enhanced media content 610 is displayed. Additionally or alternatively, the captured media content can be stored with the original camera settings used to capture the media content and when the user subsequently opens the media content (e.g., via a photo gallery application), the media content management module 608 automatically generates the enhanced media content 610 that is displayed to the user. By re-generating the enhanced media content 610 each time the media content is opened, the electronic device 102 takes into account changes made to the artificial intelligence model 202 over time.

Additionally or alternatively, the captured media content can be stored with both the original camera settings used to capture the media content and the camera settings indicated by the camera settings indication 606. When the user subsequently opens the media content (e.g., via a photo gallery application), the enhanced media content 610 is displayed. When another user opens the media content, the media content with the original camera settings used to capture the media content are used. Additionally or alternatively, multiple camera settings indications 606 may be generated for multiple different users of the electronic device 102 using different artificial intelligence models 202 associated with the different users. The current user of the electronic device 102 can be detected (e.g., based on which user logged into the electronic device 102, based on facial or voice recognition of the user currently using the device, etc.) and the enhanced media content using the camera settings indication 606 for the current user of the electronic device 102 is displayed.

In one or more implementations, the artificial intelligence model 202 is trained based on user input from multiple users. For example, the artificial intelligence model 202 may be stored on a remote device (e.g., accessed via the internet) or in the cloud. The artificial intelligence system 124 downloads the artificial intelligence model 202, trains the artificial intelligence model 202 based on received media content metadata 204 and user input 206 as discussed above, and transmits the artificial intelligence model 202 back to the remoted device or the cloud. Other users (e.g., friends or acquaintances of the user of the electronic device 102) are also able to further train the artificial intelligence model 202 based on the received media content metadata and user input at their devices. The artificial intelligence model 202 can be trained based on the user input of multiple different users of multiple different electronic devices. This allows the artificial intelligence model 202 to generate a camera settings indication 606 to fit all of the users in a greater variety of situations.

In one or more implementations, the media content metadata 602 is associated with a media content received from another device, such as an image captured with another electronic device and sent by a friend of the user of the electronic device 102. In such situations, the received media content is converted to an enhanced media content 610 at the electronic device 102. Accordingly, when the user of the electronic device 102 subsequently opens the media content (e.g., via a photo gallery application), the enhanced media content 610 is displayed even though the original media content was not captured by the electronic device 102. In some situations, the received media content is converted to an enhanced media content 610 at the electronic device 102 only if the received media content was captured by the other device (rather than media content obtained by the other device from other sources, such as downloaded from a social media account or forwarded to the other device). Whether the received media content was captured by the other device can be determined in various manners, such as by analyzing the media content metadata associated with the media content. The media content metadata may include various information allowing the other device to be identified, such as an identifier of the device that captured the media content, a manufacturer or model of the device that captured the media content, and so forth. If this information is not included in the media content metadata, or does not match information that the electronic device 102 already knows about the other device, then the media content is determined to have not been captured by the other device.

The electronic device 102 optionally displays a user interface showing changes made to a received media content.

Figure 7:
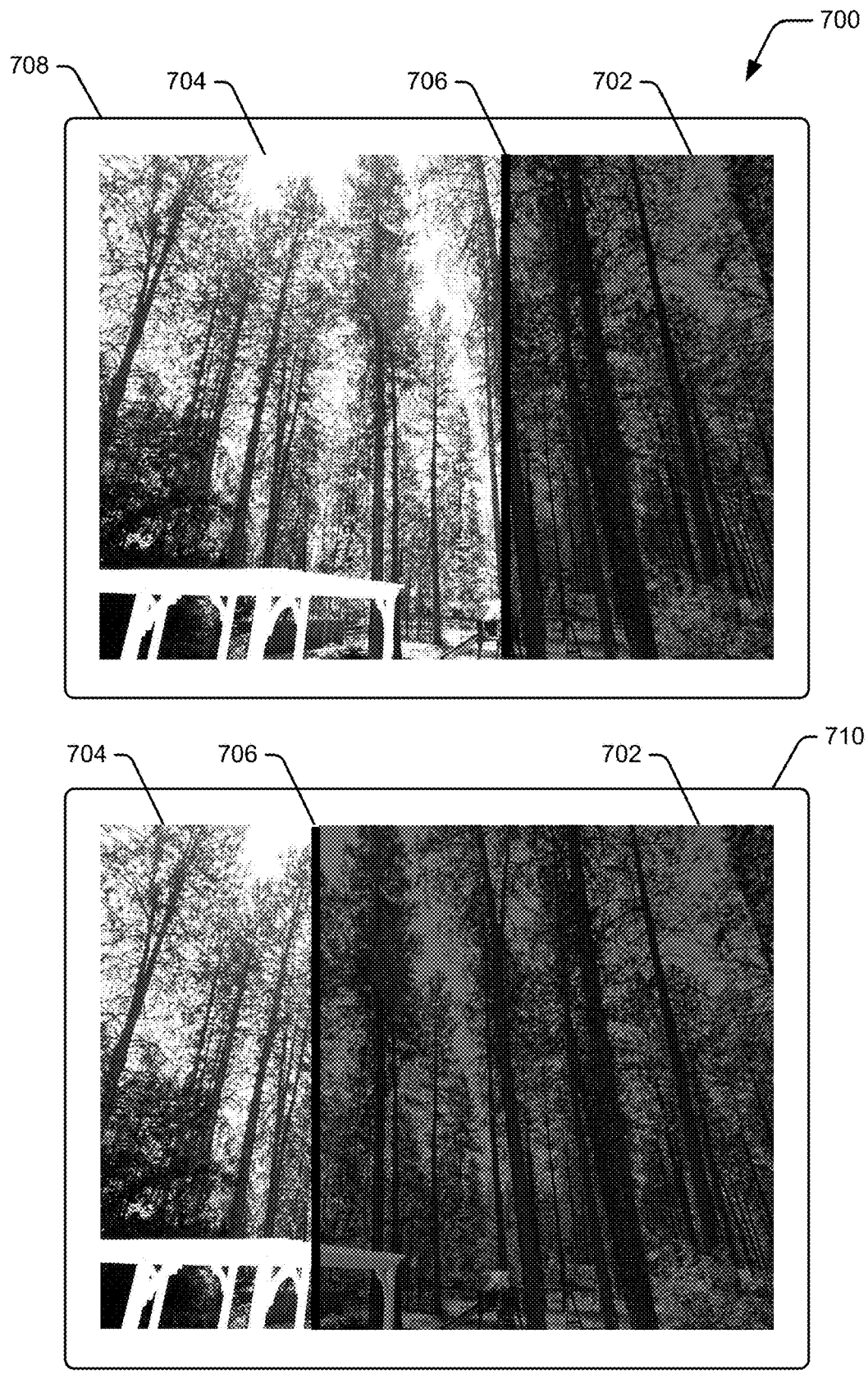
FIG. 7 illustrates an example user interface showing changes made to an image.

FIG. 7 illustrates an example user interface 700 showing changes made to media content. The user interface 700 can be displayed by any of various programs, applications, or modules, such as the camera capture module 120, the media editing module 122, a photo gallery application, and so forth.

The user interface 700 concurrently displays two images 702 and 704, one of which (e.g., image 702) is the image displayed with the camera settings received from the other device and the other of which (e.g., image 704) is the image displayed with the camera settings indication 606. The images 702 and 704 are displayed overlapping and the user can move a bar 706 left or right to control to display different portions of the images 702 and 704. As illustrated at 708, the bar 706 is nearer to the right side of the user interface 700 so that more of image 704 is displayed than image 702. As illustrated at 710, the bar 706 is nearer to the left side of the user interface 700 so that more of image 702 is displayed than image 704. The user can move the bar 706 left and right as desired, allowing the user to easily see the differences between the image with the camera settings used to capture the image and the image with the camera settings indication 606.

Returning to FIG. 6, in one or more implementations, the electronic device 102 knows the artificial intelligence model for a user of another electronic device. Accordingly, when a media content is to be transferred from the electronic device 102 to the other electronic device, an enhanced media content based on the artificial intelligence model of the user of the other electronic device is generated at the electronic device 102 and transmitted to the other electronic device. This allows the electronic device 102 to capture or otherwise obtain media content, generate enhanced media content using the camera settings indication indicated by the artificial intelligence model of the user of the other electronic device, and transmit the enhance media content to the other device. The other electronic device thus receives the media content already enhanced for the user of the other electronic device.

The electronic device 102 can know the artificial intelligence model for the user of the other electronic device in various manners. For example, the user of the other electronic device may have his or her artificial intelligence model sent to the electronic device 102. Additionally or alternatively, the artificial intelligence system 124 can learn the artificial intelligence model of the other user based on media content received from the other user's device, such as by training an artificial intelligence model for the other user based on the original camera settings used to capture the media content (e.g., included in the metadata associated with the media content) and the camera settings as changed by the other user (e.g., included in the metadata associated with the media content) analogous to the training of the artificial intelligence model 202 discussed above.

Figure 8:
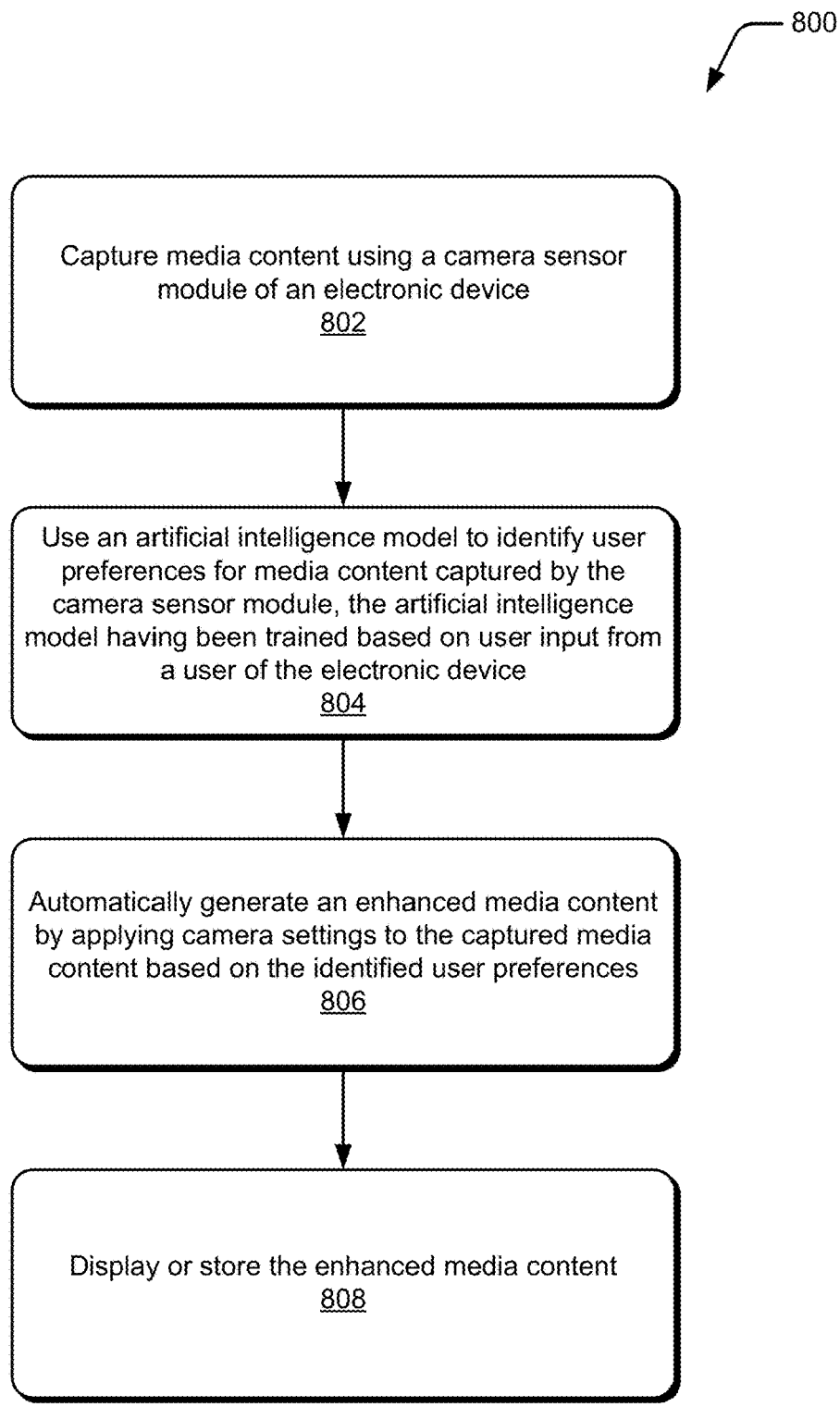
FIGS. 8 and 9 illustrate an example processes for implementing the techniques discussed herein in accordance with one or more embodiments.

FIG. 8 illustrates an example process 800 for implementing the techniques discussed herein in accordance with one or more embodiments. Process 800 is carried out by an artificial intelligence system, such as a camera sensor module 114, an artificial intelligence system 124, and a media content management module 608 of FIG. 1 or FIG. 6, and can be implemented in software, firmware, hardware, or combinations thereof. Process 800 is shown as a set of acts and is not limited to the order shown for performing the operations of the various acts.

In process 800, media content is captured using a camera sensor module of an electronic device (act 802). The media content can be, for example, and image.

An artificial intelligence model is used to identify user preferences for media content captured by the camera sensor module (act 804). The artificial intelligence model has been trained based on user input from a user of the electronic device.

An enhanced media content is automatically generated by applying camera settings to the captured media content based on the identified user preferences (act 806). Various camera settings may be applied, such as at least one of a saturation setting, a brightness setting, a white balance setting, a sharpness setting, and a color tint setting.

The enhanced media content is displayed or stored (act 808). Additionally or alternatively various other actions can be taken, such as sharing the enhanced media content (e.g., uploading the enhanced media content to a social media application or system, emailing or otherwise sending the enhanced media content to another person). Accordingly, the captured media content can be displayed as enhanced media content in accordance with preferences of the user.

Figure 9:
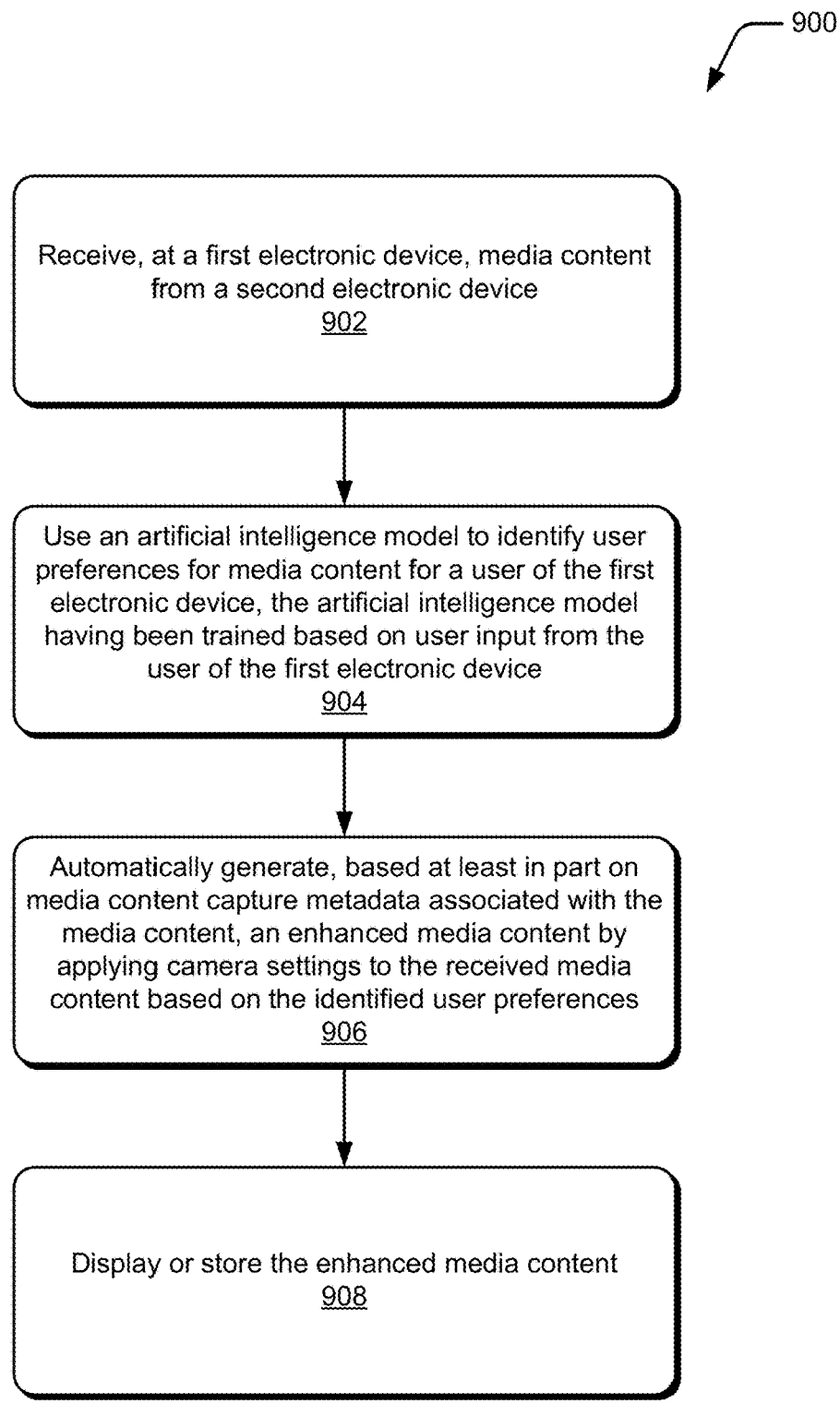

FIG. 9 illustrates an example process 900 for implementing the techniques discussed herein in accordance with one or more embodiments. Process 900 is carried out by an artificial intelligence system, such as a communication system 112, an artificial intelligence system 124, and a media content management module 608 of FIG. 1 or FIG. 6, and can be implemented in software, firmware, hardware, or combinations thereof. Process 900 is shown as a set of acts and is not limited to the order shown for performing the operations of the various acts.

In process 900, at a first electronic device media content is received from a second electronic device (act 902). The media content can be, for example, and image.

An artificial intelligence model is used to identify user preferences for media content for a user of the first electronic device (act 904). The artificial intelligence model has been trained based on user input from the user of the first electronic device.

An enhanced media content is automatically generated based at least in part on media content capture metadata associated with the media content (act 906). The enhanced media content is generated by applying camera settings to the received media content based on the identified user preferences.

The enhanced media content is displayed or stored (act 908). Additionally or alternatively various other actions can be taken, such as sharing the enhanced media content (e.g., uploading the enhanced media content to a social media application or system, emailing or otherwise sending the enhanced media content to another person). Accordingly, the captured media content can be displayed as enhanced media content in accordance with preferences of the user.

Figure 10:
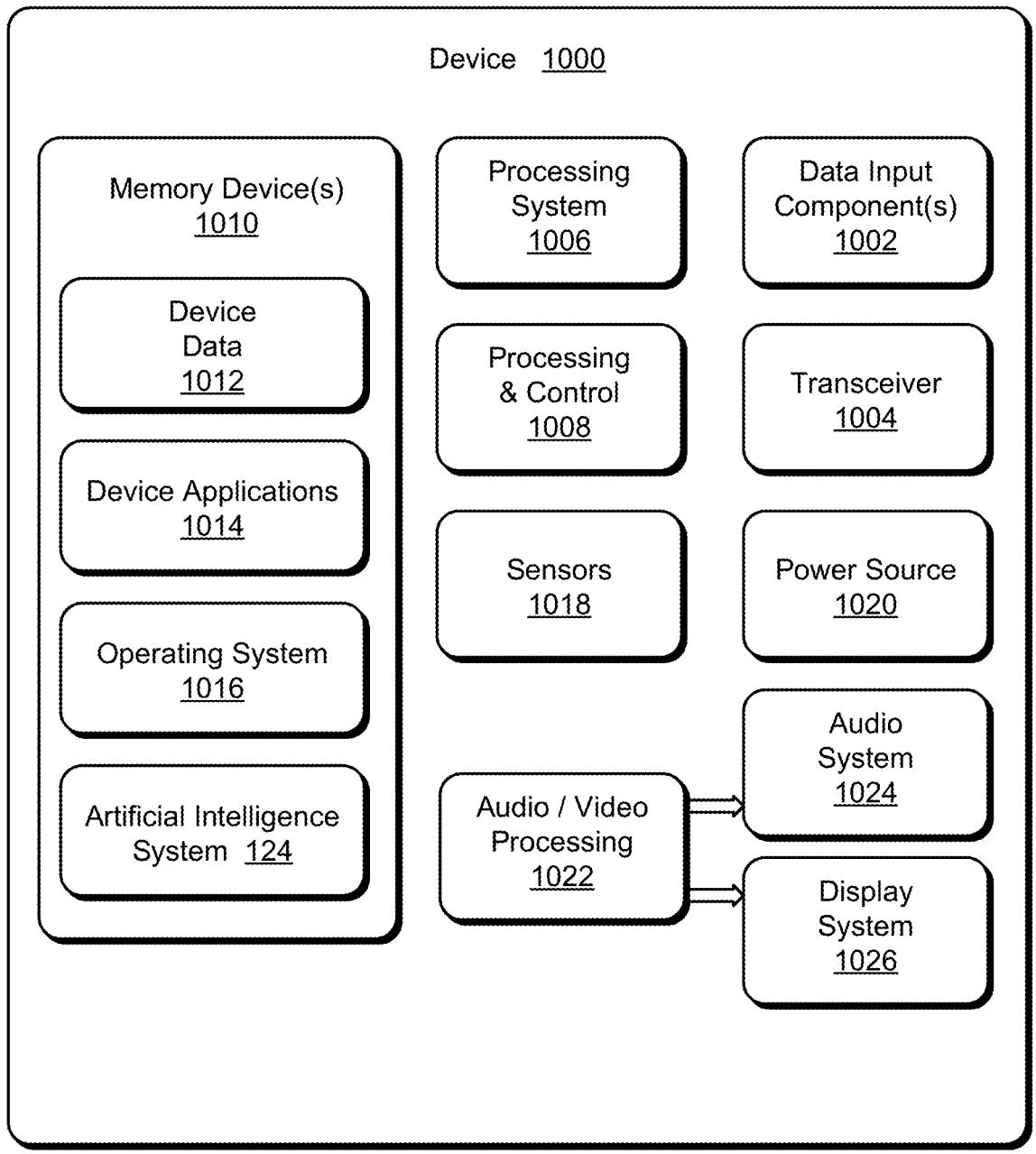
FIG. 10 illustrates an example system including an electronic device implementing the techniques discussed herein.

FIG. 10 illustrates various components of an example electronic device that can implement embodiments of the techniques discussed herein. The electronic device 1000 can be implemented as any of the devices described with reference to the previous FIG.s, such as any type of client device, mobile phone, tablet, computing, communication, entertainment, gaming, media playback, or other type of electronic device. In one or more embodiments the electronic device 1000 includes the artificial intelligence system 124, described above.

The electronic device 1000 includes one or more data input components 1002 via which any type of data, media content, or inputs can be received such as user-selectable inputs, messages, music, television content, recorded video content, and any other type of text, audio, video, or image data received from any content or data source. The data input components 1002 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1002 may also include various other input components such as microphones, touch sensors, touchscreens, keyboards, and so forth.

The device 1000 includes communication transceivers 1004 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 1000 includes a processing system 1006 of one or more processors (e.g., any of microprocessors, controllers, and the like) or a processor and memory system implemented as a system-on-chip (SoC) that processes computer-executable instructions. The processing system 1006 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 1008. The device 1000 may further include any type of a system bus or other data and command transfer system that couples the various components within the device. A system bus can include any one or combination of different bus structures and architectures, as well as control and data lines.

The device 1000 also includes computer-readable storage memory devices 1010 that enable one or both of data and instruction storage thereon, such as data storage devices that can be accessed by an electronic device, and that provide persistent storage of data and executable instructions (e.g., software applications, programs, functions, and the like). Examples of the computer-readable storage memory devices 1010 include volatile memory and non-volatile memory, fixed and removable media devices, and any suitable memory device or electronic data storage that maintains data for electronic device access. The computer-readable storage memory can include various implementations of random access memory (RAM), read-only memory (ROM), flash memory, and other types of storage media in various memory device configurations. The device 1000 may also include a mass storage media device.

The computer-readable storage memory device 1010 provides data storage mechanisms to store the device data 1012, other types of information or data, and various device applications 1014 (e.g., software applications). For example, an operating system 1016 can be maintained as software instructions with a memory device and executed by the processing system 1006 to cause the processing system 1006 to perform various acts. The device applications 1014 may also include a device manager, such as any form of a control application, software application, signal-processing and control module, code that is native to a particular device, a hardware abstraction layer for a particular device, and so on.

The device 1000 can also include one or more device sensors 1018, such as any one or more of an ambient light sensor, a proximity sensor, a touch sensor, an infrared (IR) sensor, accelerometer, gyroscope, thermal sensor, audio sensor (e.g., microphone), and the like. The device 1000 can also include one or more power sources 1020, such as when the device 1000 is implemented as a mobile device. The power sources 1020 may include a charging or power system, and can be implemented as a flexible strip battery, a rechargeable battery, a charged super-capacitor, or any other type of active or passive power source.

The device 1000 additionally includes an audio or video processing system 1022 that generates one or both of audio data for an audio system 1024 and display data for a display system 1026. In accordance with some embodiments, the audio/video processing system 1022 is configured to receive call audio data from the transceiver 1004 and communicate the call audio data to the audio system 1024 for playback at the device 1000. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for automatically customizing camera settings for users have been described in language specific to features or methods, the subject of the appended claims is not necessarily limited to the specific features or methods described. Rather, the specific features and methods are disclosed as example implementations of techniques for implementing automatically customizing camera settings for users. Further, various different embodiments are described, and it is to be appreciated that each described embodiment can be implemented independently or in connection with one or more other described embodiments. Additional aspects of the techniques, features, and/or methods discussed herein relate to one or more of the following:

In some aspects, the techniques described herein relate to a method including: capturing media content using a camera sensor module of an electronic device; using an artificial intelligence model to identify user preferences for media content captured by the camera sensor module, the artificial intelligence model having been trained based on user input from a user of the electronic device; automatically generating an enhanced media content by applying camera settings to the captured media content based on the identified user preferences; and displaying or storing the enhanced media content.

In some aspects, the techniques described herein relate to a method, wherein the media content includes an image.

In some aspects, the techniques described herein relate to a method, wherein the camera settings include at least one of a saturation setting, a brightness setting, a white balance setting, a sharpness setting, and a color tint setting.

In some aspects, the techniques described herein relate to a method, further including receiving the media content from a camera capture software module of the electronic device.

In some aspects, the techniques described herein relate to a method, wherein the using the artificial intelligence model and the generating the enhanced media content is performed by a camera capture software module of the electronic device.

In some aspects, the techniques described herein relate to a method, wherein the using the artificial intelligence model and the generating the enhanced media content is performed by a media editing software module of the electronic device.

In some aspects, the techniques described herein relate to a method, wherein the artificial intelligence model is trained based at least in part on a modified media content recommendation displayed to the user and a user input in response to the modified media content recommendation.

In some aspects, the techniques described herein relate to a method, wherein the camera sensor module includes multiple camera sensors each corresponding to one of multiple artificial intelligence models, and the using includes using one of the multiple artificial intelligence models that corresponds to one of the multiple camera sensors that captured the media content.

In some aspects, the techniques described herein relate to a method, wherein the camera sensor module includes multiple camera lenses each corresponding to one of multiple artificial intelligence models, and the using includes using one of the multiple artificial intelligence models that corresponds to one of the multiple camera lenses used to capture the media content.

In some aspects, the techniques described herein relate to a method, further including: receiving the artificial intelligence model from a remote device; training the artificial intelligence model based on media content metadata and user input received for additional media content captured by the camera sensor module; and transmitting the trained artificial intelligence model to the remote device without transmitting the media content metadata and the user input received for the additional media content to the remote device.

In some aspects, the techniques described herein relate to an electronic device including: a processor implemented in hardware; a camera sensor module at least one camera lens and at least one camera sensor; and a computer-readable storage memory having stored thereon multiple instructions that, responsive to execution by the processor, cause the processor to perform acts including: capturing media content using the camera sensor module; using an artificial intelligence model to identify user preferences for media content captured by the camera sensor module, the artificial intelligence model having been trained based on user input from a user of the electronic device; automatically generating an enhanced media content by applying camera settings to the captured media content based on the identified user preferences; and displaying or storing the enhanced media content.

In some aspects, the techniques described herein relate to an electronic device, wherein the media content includes an image.

In some aspects, the techniques described herein relate to an electronic device, wherein the camera settings include at least one of a saturation setting, a brightness setting, a white balance setting, a sharpness setting, and a color tint setting.

In some aspects, the techniques described herein relate to an electronic device, the acts further including receiving the media content from a camera capture software module of the electronic device.

In some aspects, the techniques described herein relate to an electronic device, wherein the using the artificial intelligence model and the generating the enhanced media content is performed by a camera capture software module of the electronic device.

In some aspects, the techniques described herein relate to an electronic device including: a camera sensor module, implemented at least in part in hardware, to capture media content; an artificial intelligence system to use an artificial intelligence model to identify user preferences for media content captured by the camera sensor module, the artificial intelligence model having been trained based on user input from a user of the electronic device; and a media content management module to automatically generate an enhanced media content by applying camera settings to the captured media content based on the identified user preferences, and to display or store the enhanced media content.

In some aspects, the techniques described herein relate to an electronic device, wherein the media content management module is part of a media editing software module of the electronic device.

In some aspects, the techniques described herein relate to an electronic device, wherein the artificial intelligence model is trained based at least in part on a modified media content recommendation displayed to the user and a user input in response to the modified media content recommendation.

In some aspects, the techniques described herein relate to an electronic device, wherein the camera sensor module includes multiple camera sensors each corresponding to one of multiple artificial intelligence models, and to use the artificial intelligence model is to use one of the multiple artificial intelligence models that corresponds to one of the multiple camera sensors that captured the media content.

In some aspects, the techniques described herein relate to an electronic device, wherein the camera sensor module includes multiple camera lenses each corresponding to one of multiple artificial intelligence models, and to use the artificial intelligence model is to use one of the multiple artificial intelligence models that corresponds to one of the multiple camera lenses used to capture the media content.

In some aspects, the techniques described herein relate to a method including: receiving, at a first electronic device, media content from a second electronic device; using an artificial intelligence model to identify user preferences for media content for a user of the first electronic device, the artificial intelligence model having been trained based on user input from the user of the first electronic device; automatically generating, based at least in part on media content capture metadata associated with the media content, an enhanced media content by applying camera settings to the received media content based on the identified user preferences; and displaying or storing the enhanced media content.

In some aspects, the techniques described herein relate to a method, wherein the media content includes an image.

In some aspects, the techniques described herein relate to a method, further including: receiving, from the second electronic device, an additional enhanced media content, the additional enhanced media content having been generated using an artificial intelligence model to identify preferences for the user of the first electronic device; and displaying or storing the additional enhanced media content.

In some aspects, the techniques described herein relate to a method, the displaying or storing the enhanced media content including concurrently displaying both the enhanced media content and the media content.

In some aspects, the techniques described herein relate to a method, further including: capturing, at the first electronic device, an additional media content; using an artificial intelligence model to identify user preferences for media content for a user of the second electronic device, the artificial intelligence model having been trained based on user input from the user of the second electronic device; automatically generating, based at least in part on media content capture metadata associated with the additional media content, an additional enhanced media content by applying camera settings to the received media content based on the identified user preferences for the user of the second electronic device; and transmitting the additional enhanced media content to the second electronic device.

In some aspects, the techniques described herein relate to a method, wherein the camera settings include at least one of a saturation setting, a brightness setting, a white balance setting, a sharpness setting, and a color tint setting.

In some aspects, the techniques described herein relate to a method, further including: receiving the artificial intelligence model from a remote device; training the artificial intelligence model based on media content metadata and user input received for additional media content; and transmitting the trained artificial intelligence model to the remote device without transmitting the media content metadata and the user input received for the additional media content to the remote device.

In some aspects, the techniques described herein relate to a first electronic device including: a processor implemented in hardware; and a computer-readable storage memory having stored thereon multiple instructions that, responsive to execution by the processor, cause the processor to perform acts including: receiving, at the first electronic device, media content from a second electronic device; using an artificial intelligence model to identify user preferences for media content for a user of the first electronic device, the artificial intelligence model having been trained based on user input from the user of the first electronic device; automatically generating, based at least in part on media content capture metadata associated with the media content, an enhanced media content by applying camera settings to the received media content based on the identified user preferences; and displaying or storing the enhanced media content.

In some aspects, the techniques described herein relate to a first electronic device, wherein the media content includes an image.

In some aspects, the techniques described herein relate to a first electronic device, the acts further including: receiving, from the second electronic device, an additional enhanced media content, the additional enhanced media content having been generated using an artificial intelligence model to identify preferences for the user of the first electronic device; and displaying or storing the additional enhanced media content.

In some aspects, the techniques described herein relate to a first electronic device, the displaying or storing the enhanced media content including concurrently displaying both the enhanced media content and the media content.

In some aspects, the techniques described herein relate to a first electronic device, the acts further including: capturing, at the first electronic device, an additional media content: using an artificial intelligence model to identify user preferences for media content for a user of the second electronic device, the artificial intelligence model having been trained based on user input from the user of the second electronic device: automatically generating, based at least in part on media content capture metadata associated with the additional media content, an additional enhanced media content by applying camera settings to the received media content based on the identified user preferences for the user of the second electronic device; and transmitting the additional enhanced media content to the second electronic device.

In some aspects, the techniques described herein relate to a first electronic device, wherein the camera settings include at least one of a saturation setting, a brightness setting, a white balance setting, a sharpness setting, and a color tint setting.

In some aspects, the techniques described herein relate to a first electronic device, the acts further including: receiving the artificial intelligence model from a remote device; training the artificial intelligence model based on media content metadata and user input received for additional media content; and transmitting the trained artificial intelligence model to the remote device without transmitting the media content metadata and the user input received for the additional media content to the remote device.

In some aspects, the techniques described herein relate to a first electronic device including: a communication system, implemented at least in part in hardware, to receive media content from a second electronic device; an artificial intelligence system to use an artificial intelligence model to identify user preferences for media content for a user of the first electronic device, the artificial intelligence model having been trained based on user input from the user of the first electronic device: a media content management module to automatically generate, based at least in part on media content capture metadata associated with the media content, an enhanced media content by applying camera settings to the received media content based on the identified user preferences, and to display or store the enhanced media content.

In some aspects, the techniques described herein relate to a first electronic device, wherein the media content includes an image.

In some aspects, the techniques described herein relate to a first electronic device, wherein the communication system is further to receive, from the second electronic device, an additional enhanced media content, the additional enhanced media content having been generated using an artificial intelligence model to identify preferences for the user of the first electronic device, and the media content management module is further to display or store the additional enhanced media content.

In some aspects, the techniques described herein relate to a first electronic device, wherein to display or store the enhanced media content is to concurrently display both the enhanced media content and the media content.

In some aspects, the techniques described herein relate to a first electronic device, further including: a camera sensor module, implemented at least in part in hardware, to capture an additional media content; wherein the artificial intelligence system is further to use an additional artificial intelligence model to identify user preferences for media content for a user of the second electronic device, the additional artificial intelligence model having been trained based on user input from the user of the second electronic device; wherein the media content management module is further to automatically generate, based at least in part on media content capture metadata associated with the additional media content, an additional enhanced media content by applying camera settings to the received media content based on the identified user preferences for the user of the second electronic device; and wherein the communication system is further to transmit the additional enhanced media content to the second electronic device.

In some aspects, the techniques described herein relate to a first electronic device, wherein the camera settings include at least one of a saturation setting, a brightness setting, a white balance setting, a sharpness setting, and a color tint setting.

What is claimed is:

1. A method comprising:
    capturing media content using a camera sensor module of an electronic device;
    using an artificial intelligence model to identify user preferences for the media content captured by the camera sensor module, the artificial intelligence model having been trained based on:
        user input from a user of the electronic device; and
        metadata related to editing operations performed previously on the media content;
    automatically applying camera settings to the camera sensor module, the camera settings based on the user preferences; and
    displaying or storing additional media content captured by the camera sensor module using the camera settings.

2. The method of claim 1, wherein the media content comprises an image.

3. The method of claim 1, wherein the camera settings include at least one of a saturation setting, a brightness setting, a white balance setting, a sharpness setting, and a color tint setting.

4. The method of claim 1, further comprising receiving the media content from a camera capture software module of the electronic device.

5. The method of claim 1, wherein the using the artificial intelligence model and performing the editing operations are performed by a camera capture software module of the electronic device.

6. The method of claim 1, wherein the using the artificial intelligence model and performing the editing operations are performed by a media editing software module of the electronic device.

7. The method of claim 1, wherein the artificial intelligence model is trained based at least in part on a modified media content recommendation displayed to the user and a user input in response to the modified media content recommendation.

8. The method of claim 1, wherein the camera sensor module includes multiple camera sensors each corresponding to one of multiple artificial intelligence models, and the using comprises using one of the multiple artificial intelligence models that corresponds to one of the multiple camera sensors that captured the media content.

9. The method of claim 1, wherein the camera sensor module includes multiple camera lenses each corresponding to one of multiple artificial intelligence models, and the using comprises using one of the multiple artificial intelligence models that corresponds to one of the multiple camera lenses used to capture the media content.

10. The method of claim 1, further comprising:
    receiving the artificial intelligence model from a remote device;
    training the artificial intelligence model based on media content metadata and user input received for additional media content captured by the camera sensor module; and
    transmitting the trained artificial intelligence model to the remote device without transmitting the media content metadata and the user input received for the additional media content to the remote device.

11. The method of claim 1, further comprising applying an edit to the additional media content based on the user preferences.

12. An electronic device comprising:
    a processor implemented in hardware;
    a camera sensor module at least one camera lens and at least one camera sensor; and
    a computer-readable storage memory having stored thereon multiple instructions that, responsive to execution by the processor, cause the processor to perform acts including:
        capturing media content using the camera sensor module;

using an artificial intelligence model to identify user preferences for media content captured by the camera sensor module, the artificial intelligence model having been trained based on:
  user input from a user of the electronic device; and
  metadata related to editing operations performed previously on the media content;
automatically applying camera settings to the camera sensor module, the camera settings based on the user preferences; and
displaying or storing additional media content captured by the camera sensor module using the camera settings.

13. The electronic device of claim 12, wherein the media content comprises an image.

14. The electronic device of claim 12, wherein the camera settings include at least one of a saturation setting, a brightness setting, a white balance setting, a sharpness setting, and a color tint setting.

15. The electronic device of claim 12, the acts further including receiving the media content from a camera capture software module of the electronic device.

16. The electronic device of claim 12, wherein the using the artificial intelligence model performing the editing operations are performed by a camera capture software module of the electronic device.

17. An electronic device comprising:
  a camera sensor module, implemented at least in part in hardware, to capture media content;
  an artificial intelligence system to use an artificial intelligence model to identify user preferences for media content captured by the camera sensor module, the artificial intelligence model having been trained based on:
    user input from a user of the electronic device; and
    metadata related to editing operations performed previously on the media content; and
  a media content management module to automatically apply camera settings to the camera sensor module based on the user preferences, and to display or store additional media content captured by the camera sensor module using the camera settings.

18. The electronic device of claim 17, wherein the media content management module is part of a media editing software module of the electronic device.

19. The electronic device of claim 17, wherein the camera sensor module includes multiple camera sensors each corresponding to one of multiple artificial intelligence models, and to use the artificial intelligence model is to use one of the multiple artificial intelligence models that corresponds to one of the multiple camera sensors that captured the media content.

20. The electronic device of claim 17, wherein the camera sensor module includes multiple camera lenses each corresponding to one of multiple artificial intelligence models, and to use the artificial intelligence model is to use one of the multiple artificial intelligence models that corresponds to one of the multiple camera lenses used to capture the media content.

* * * * *